(12) United States Patent
Micalizzi, Jr.

(10) Patent No.: US 7,735,099 B1
(45) Date of Patent: Jun. 8, 2010

(54) METHOD AND SYSTEM FOR PROCESSING NETWORK DATA

(75) Inventor: Charles Micalizzi, Jr., Capistrano Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1073 days.

(21) Appl. No.: 11/317,315

(22) Filed: Dec. 23, 2005

(51) Int. Cl.
*G06F 3/00* (2006.01)
*G06F 9/44* (2006.01)
*G06F 13/00* (2006.01)
*G06F 15/167* (2006.01)
*G06F 5/00* (2006.01)

(52) U.S. Cl. ............... 719/328; 709/212; 709/213; 709/214; 709/215; 709/216; 710/52; 710/56; 711/147; 711/148; 711/149

(58) Field of Classification Search ............... 719/328; 709/213–216, 230–237, 250, 212; 370/351–430; 710/52, 56; 711/147–149
See application file for complete search history.

(56) References Cited

U.S. PATENT DOCUMENTS

| | | | |
|---|---|---|---|
| 5,390,299 A | 2/1995 | Rege et al. | |
| 6,272,551 B1 | 8/2001 | Martin et al. | |
| 6,678,734 B1 | 1/2004 | Haatainen et al. | |
| 6,859,867 B1 | 2/2005 | Berry | |
| 6,976,174 B2 | 12/2005 | Terrell et al. | |
| 7,385,974 B2 * | 6/2008 | Elzur | 370/389 |
| 7,400,639 B2 * | 7/2008 | Madukkarumukumana et al. | 370/429 |
| 7,460,473 B1 * | 12/2008 | Kodama et al. | 370/230 |
| 7,493,427 B2 * | 2/2009 | Freimuth et al. | 710/52 |
| 7,523,179 B1 * | 4/2009 | Chu et al. | 709/222 |
| 2003/0212735 A1 | 11/2003 | Hicok et al. | |
| 2003/0214909 A1 | 11/2003 | Maciel | |
| 2004/0047361 A1 * | 3/2004 | Fan et al. | 370/411 |
| 2004/0057380 A1 | 3/2004 | Biran et al. | |
| 2005/0021680 A1 * | 1/2005 | Ekis et al. | 709/219 |
| 2005/0135415 A1 * | 6/2005 | Fan et al. | 370/468 |
| 2005/0144402 A1 | 6/2005 | Beverly | |
| 2005/0198410 A1 | 9/2005 | Kagan et al. | |
| 2005/0276281 A1 * | 12/2005 | Jones | 370/469 |
| 2006/0015651 A1 * | 1/2006 | Freimuth et al. | 709/250 |

(Continued)

OTHER PUBLICATIONS

"Office Action from USPTO dated Jul. 17, 2008 for U.S. Appl. No. 11/223,693".

(Continued)

*Primary Examiner*—Qing-Yuan Wu
(74) *Attorney, Agent, or Firm*—Klein, O'Neill & Singh, LLP

(57) ABSTRACT

Method and system for a network for receiving and sending network packets is provided. The system includes a host processor that executes an operating system for a host system and at least one application that runs in a context that is different from a context of the operating system; and a network adapter with a hardware device that can run a network protocol stack, wherein the application can access the network adapter directly via an application specific interface layer without using the operating system and the application designates a named memory buffer for a network connection and when data is received by the network adapter for the network connection, then the network adapter passes the received data directly to the designated named buffer.

34 Claims, 9 Drawing Sheets

U.S. PATENT DOCUMENTS

| | | | |
|---|---|---|---|
| 2006/0031524 A1* | 2/2006 | Freimuth et al. | 709/227 |
| 2006/0034283 A1* | 2/2006 | Ko et al. | 370/392 |
| 2006/0067346 A1* | 3/2006 | Tucker et al. | 370/412 |
| 2006/0092934 A1* | 5/2006 | Chung et al. | 370/389 |
| 2006/0193317 A1* | 8/2006 | Rajagopalan et al. | 370/389 |
| 2007/0014245 A1* | 1/2007 | Aloni et al. | 370/252 |
| 2007/0033301 A1* | 2/2007 | Aloni et al. | 710/22 |
| 2007/0162639 A1* | 7/2007 | Chu et al. | 710/22 |
| 2007/0255802 A1* | 11/2007 | Aloni et al. | 709/217 |
| 2008/0235484 A1* | 9/2008 | Tal et al. | 711/201 |

OTHER PUBLICATIONS

"Office Action from USPTO dated Oct. 10, 2008 for U.S. Appl. No. 11/222,594".

"Final Office Action from USPTO dated Dec. 11, 2008 for U.S. Appl. No. 11/223,693".

"Final Office Action from USPTO dated Apr. 17, 2009 for U.S. Appl. No. 11/222,594".

"Office Action from USPTO dated May 13, 2009 for U.S. Appl. No. 11/223,693".

"Office Action from USPTO dated Aug. 14, 2009 for U.S. Appl. No. 11/222,594".

"Notice of Allowance from USPTO dated Nov. 10, 2009 for U.S. Appl. No. 11/223,693".

"Final Office Action from USPTO dated Mar. 10, 2010 for U.S. Appl. No. 11/222,594".

* cited by examiner

| 3(i) | 3(ii) |

FIG. 5A(ii)

| 5(i) |
| 5(ii) |

US 7,735,099 B1

METHOD AND SYSTEM FOR PROCESSING NETWORK DATA

CROSS REFERENCE TO RELATED APPLICATIONS

This application is related to the following applications, incorporated herein by reference in their entirety: Ser. No. 11/223,693, now U.S. Pat. No. 7,639,715, entitled "Dedicated Application Interface for Network Systems", filed on Sep. 9, 2005;

Ser. No. 11/222,594, entitled, "METHOD AND SYSTEM FOR MEMORY VALIDATION", filed on Sep. 9, 2005; and Ser. No. 10/620,040, now U.S. Pat. No. 7,403,542, entitled "Method and System for Processing Network Data Packets", filed on Jul. 15, 2003.

BACKGROUND

1. Field of the Invention

The present invention relates to network systems, and more particularly, to offloading host system tasks for managing network related operations.

2. Background of the Invention

Computer networks are commonly used today in various applications. Computer networks typically use a layered protocol structure to manage network traffic. One common model that is typically used is the ISO model that includes a physical layer, a data link layer that includes a MAC layer, a network layer and others.

Data received and sent to a network often needs to be processed by various network protocol layers before the data is made available to an application that requested the information. Typically, a network stack places data that is received from the network in a receive buffer, which are allocated by the network layer. The receive buffers are then passed between plural protocol layers until the appropriate application that requested the data is notified that the requested data is available.

Expensive and tedious copying of data commonly takes place before the application gets the data and is undesirable.

Therefore there is a need for a system and method for processing network data without multiple copy operations.

SUMMARY OF THE INVENTION

In one aspect of the present invention, a system coupled to a network for receiving and sending network packets is provided. The system includes a host processor that executes an operating system for a host system and at least one application that runs in a context that is different from a context of the operating system; and a network adapter with a hardware device that can run a network protocol stack, wherein the application can access the network adapter directly via an application specific interface layer without using the operating system and the application designates a named memory buffer for a network connection and when data is received by the network adapter for the network connection, then the network adapter passes the received data directly to the designated named buffer.

In another aspect of the present invention, a method for network communication is provided. The method includes initializing a socket call, wherein an application having its own context in a host computing system sends the socket call; accessing a network adapter coupled to the host system, wherein the network adapter processes network traffic by executing a network protocol, and the application running on the host system accesses the network adapter using an application specific interface layer without using an operating system that runs on the host system; sending a descriptor to the network adapter that identifies plural parameters for a network connection; designating a named buffer to a network connection; comparing if data received from a network is for a particular network connection; and transferring the received data directly to a named buffer designated for the network connection.

In yet another aspect of the present invention, a host computing system coupled to a network for receiving and transferring network packets is provided. The host computing system includes a host processor that executes an operating system and at least one application that runs in a context that is different from a context of the operating system; and a network adapter with a hardware device for executing a network protocol stack for processing network traffic, wherein the application can access the network adapter directly via an application specific interface layer without using the operating system; and the application designates a named memory buffer for a network connection and when data is received by the network adapter for the network connection, then the network adapter passes the received data directly to the designated named buffer.

In yet another aspect of the present invention, a network adapter for offloading network protocol processing from a host system is provided. The network adapter includes an offload engine that offloads network protocol processing from a host processor of the host system having an operating system and at least one application that runs in a context that is different from a context of the operating system; wherein the application can access the network adapter directly via an application specific interface layer without using the operating system and the application designates a named memory buffer for a network connection and when data is received by the network adapter for the network connection, then the network adapter passes the received data directly to the designated named buffer.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, a top-level description of common network protocols/standards and the general architecture/operation of a host system will be described. The specific architecture and operation of the preferred embodiment will then be described with reference to the general architecture.

Computing systems and devices to communicate via networks currently uses various protocols/standards.

Figure 1A:
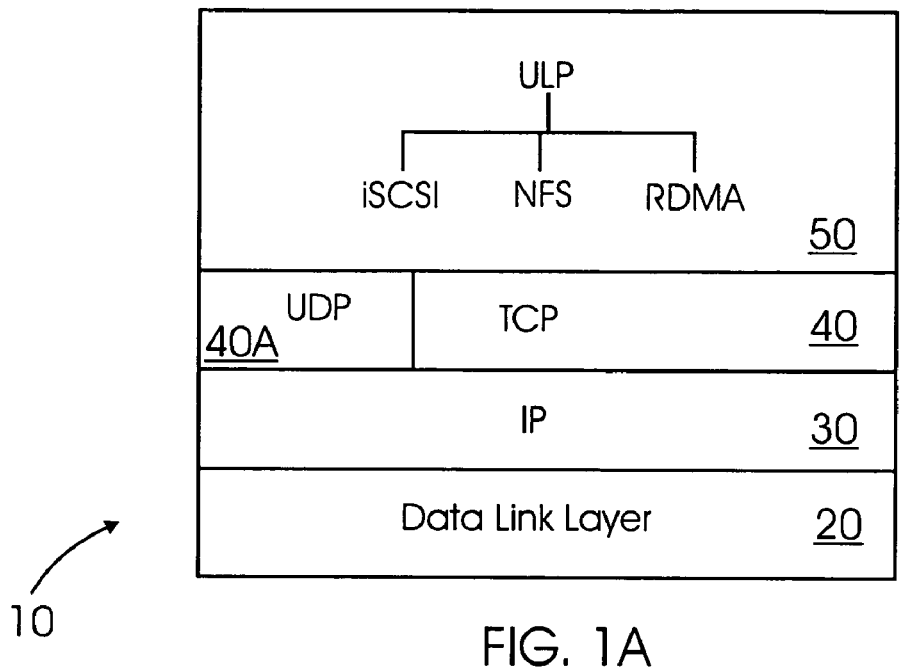
FIG. 1A shows an example of various protocol layers that are used in a networking system.

FIG. 1A shows an example of various protocol layers (10) that are used in a networking system. Data link layer (which includes the MAC layer) 20 interfaces with IP layer 30. TCP layer 40/User Datagram Protocol (UDP) layer 40A typically sits on top of IP layer 30. Upper Layer Protocols (ULPs) 50 may include plural layers, for example, the iSCSI, NFS (Network File System) and/or the RDMA layer. The following provides an introduction to some of the standards/protocols:

Transmission Control Protocol/Internet Protocol ("TCP/IP"): TCP (40) is a standard network protocol (incorporated herein by reference in its entirety) that provides connection-oriented, reliable, byte stream service. This means that two nodes establish a logical connection before sending data and that TCP 40 maintains state information regarding the data transfer. Reliable means that data is delivered in the same order that it was sent. A byte stream service means that TCP 40 views data to be sent as a continuous data stream that is sent in any way it sees fit and delivers it to the remote node as a byte stream.

IP layer (30) standard protocol (incorporated herein by reference in its entirety) provides a datagram service whose function is to enable routing of data through various network subnets. Each of these subnets could be a different physical link such as Ethernet, ATM, etc. IP layer 30 is also responsible for fragmentation of the transmit data to match a local link's MTU. IP layer 30 can fragment data at the source node or at any intervening router between the source and destination node.

A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series that is incorporated herein by reference in its entirety.

iSCSI Protocol: Internet SCSI (iSCSI) as defined by the Internet Engineering Task Force (IETF) maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. The iSCSI and TCP/IP protocol suite consist of 4 protocol layers; the application layer (of which iSCSI is one application), the transport layer (TCP), the network layer (IP) and the link layer (i.e. Ethernet).

A traditional SCSI connection between a host system and peripheral device is through parallel cabling and is limited by distance and device support constraints. For storage applications, iSCSI was developed to take advantage of network architectures based on Ethernet standards. iSCSI leverages the SCSI protocol over established networked infrastructures and defines the means for enabling block storage applications over TCP.

The iSCSI architecture is based on a client/server model. Typically, the client is a host system such as a file server that issues a read or write command. The server may be a disk array that responds to the client request. Typically the client is an initiator that initiates a read or write command and a disk array is a target that accepts a read or write command and performs the requested operation.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units are in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

RDMA: Remote Direct Memory Access (RDMA) is a standard upper layer protocol (incorporated herein by reference in its entirety) that assists one computer to directly place information in another computer's memory with minimal demands on memory bus bandwidth and CPU processing overhead. RDMA over TCP/IP defines the interoperable protocols to support RDMA operations over standard TCP/IP networks. A network interface card (or adapter) that can offload TCP/IP protocol processing and support RDMA over TCP/IP may be referred to as an RNIC.

NFS: This is a client server application that allows users to access shared files using an interface (Virtual File System).

UDP 40A is a connectionless protocol that runs on top of the IP layer 30. UDP 40A provides fewer error recovery services compared to TCP 40 and is commonly used for broadcast type messages.

Figure 1B:
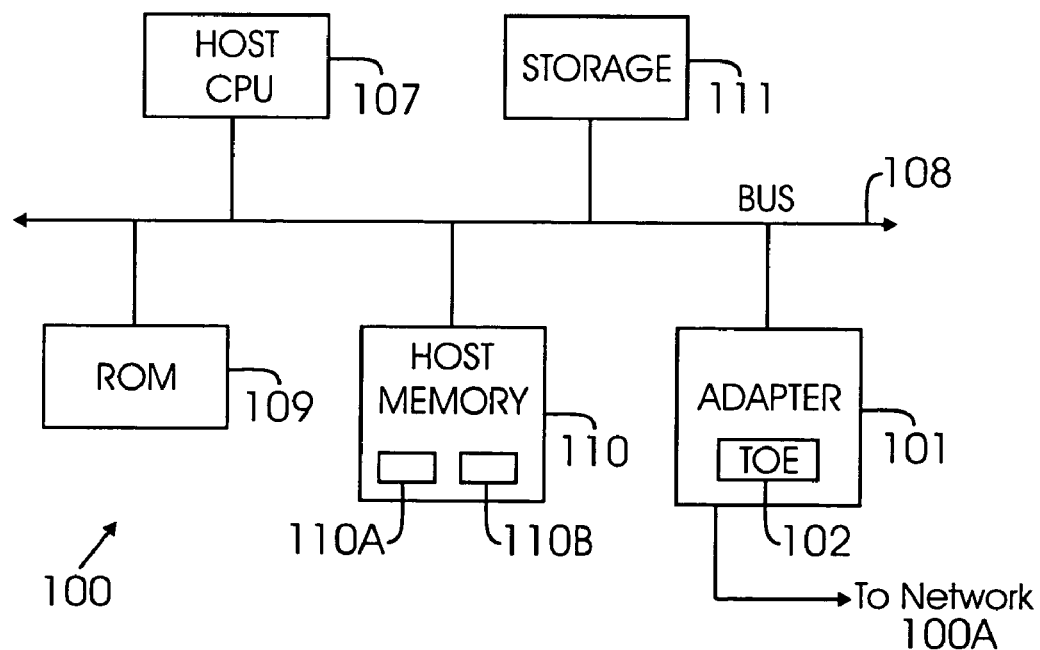
FIG. 1B shows a block diagram of a computing system.

FIG. 1B shows a block diagram of a computing system 100. Computing system 100 typically includes several functional components. These components may include a central processing unit (CPU) 107, host memory (or main/system memory) 110, input/output ("I/O") devices (not shown), read only memory 109, a network adapter 101 with a TCP offload engine (TOE) 102, and streaming storage devices (for example, tape drives) 111.

TOE 102 executes the TCP/IP protocol stack (or any other protocol stack). Furthermore, TOE 102 is used to connect host system 100 to another host system or peripheral device (not shown) via a network connection 100A.

Host memory 110 is coupled to the CPU 107 via a system bus 108 or a local memory bus (not shown). The host memory 110 is used to provide CPU 107 access to data and/or program information that is stored in host memory 110 at execution time. Typically, the host memory is composed of random access memory (RAM) circuits. A computing system with the CPU and main memory is often referred to as a host system.

In conventional systems, a host CPU (for example, 107) executes the network protocol stack in software to process network packets. Conventional TOE engines also provide only a partial solution, because they cannot handle exceptions (for example, TCP/IP exceptions).

In the configuration shown in FIG. 1B, CPU 107 does not have to execute a network protocol stack in software because TOE 102 can perform that entire function. TOE 102 can establish and maintain a network connection to process network traffic. Details of a TOE 102 are provided in patent application Ser. No. 10/620,040, now U.S. Pat. No. 7,403, 542, entitled "Method and System for Processing Network Data Packets" filed on Jul. 15, 2003, incorporated herein by reference in its entirety.

The present invention provides an offloaded implementation of a full network protocol stack (for example, a TCP/IP stack). Application Programming Interfaces (APIs) to this protocol stack are made available to allow host software to take advantage of the offloaded protocol stack for network applications.

It is noteworthy that the present invention is not limited to any particular protocol or standard. Although the figures and the foregoing examples are based on offloading TCP/IP protocol and illustrate iSCSI transactions, in one aspect of the present invention, adapter 101 may include an offload engine that can process any network protocol stack (for example, the SPX/IPX protocol) for any transaction.

Figure 2:
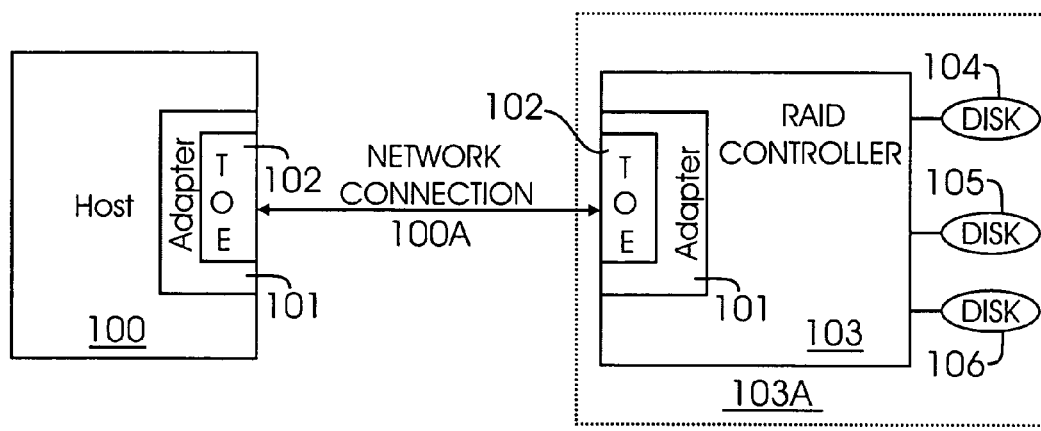
FIG. 2 shows a block diagram of a host system coupled to a storage system via a network connection, according to one aspect of the present invention.

FIG. 2 shows a block diagram of host system 100 coupled to a storage system 103A via a network connection 100A. In one aspect, TOE 102 allows connection of SCSI based mass storage devices to an Ethernet LAN. Adapter 101 may be a host bus adapter that is used by host system 100 in a storage area network to move data to and from storage systems that are a part of the storage area network.

Adapter 101, according to the present invention, can be used for both initiator and target applications (i.e. can be used on a host bus adapter 101 or with a redundant array of inexpensive disks ("RAID") controller 103). As shown in FIG. 2, RAID controller 103 is coupled to plural storage devices, for example, 104, 105 and 106.

Adapter 101 may be on a PCI development board with a Field Programmable gate Array ("FPGA"). The chip may also be integrated into an Application Specific Integrated Circuit ("ASIC") with an embedded serialize/ de-serializer ("SERDES") (not shown) and internal programmable random access memory ("RAM").

Figure 3I:
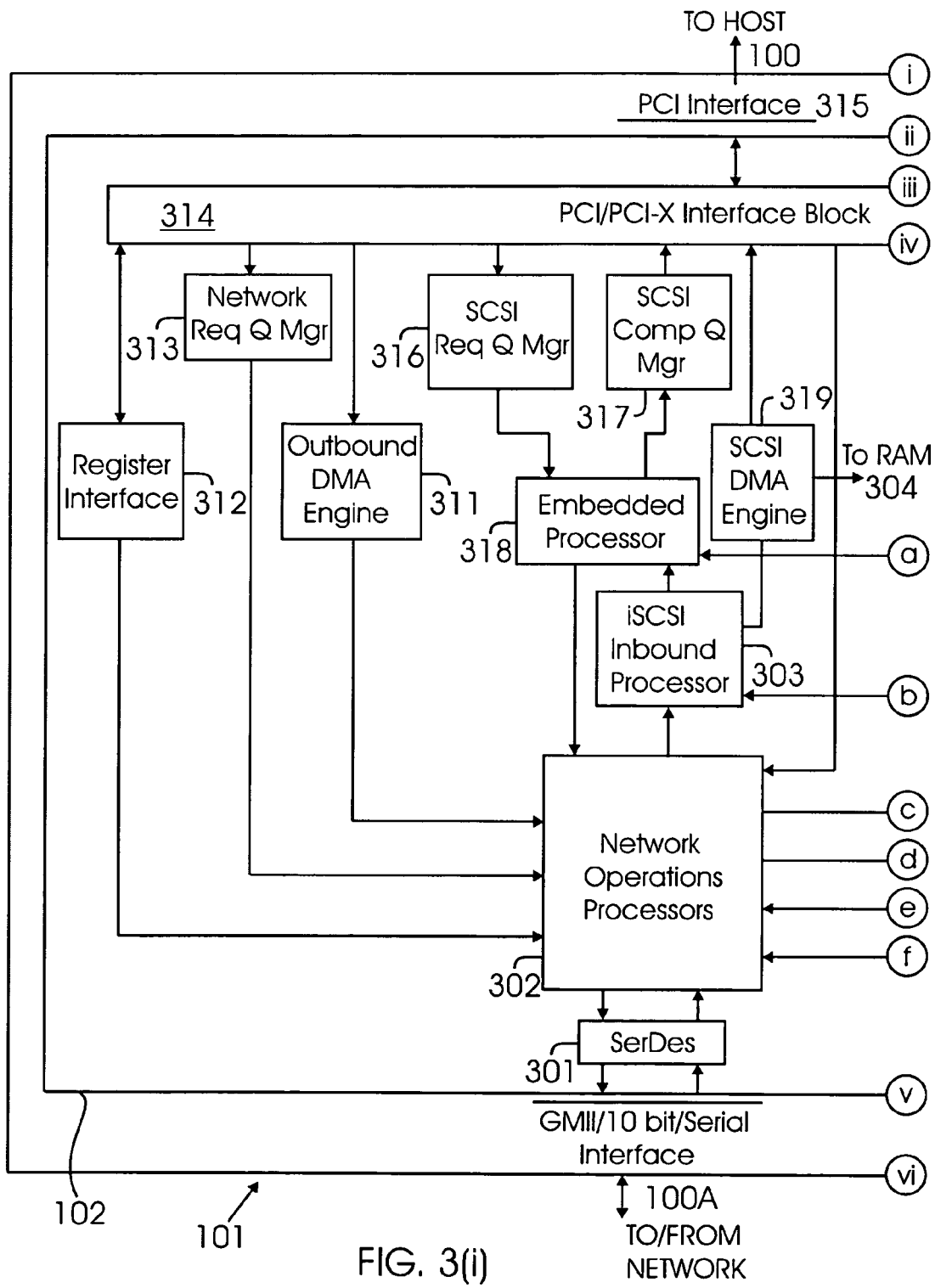
FIG. 3 is a block diagram of a network adapter with a TOE, according to one aspect of the present invention.
Figure 3:
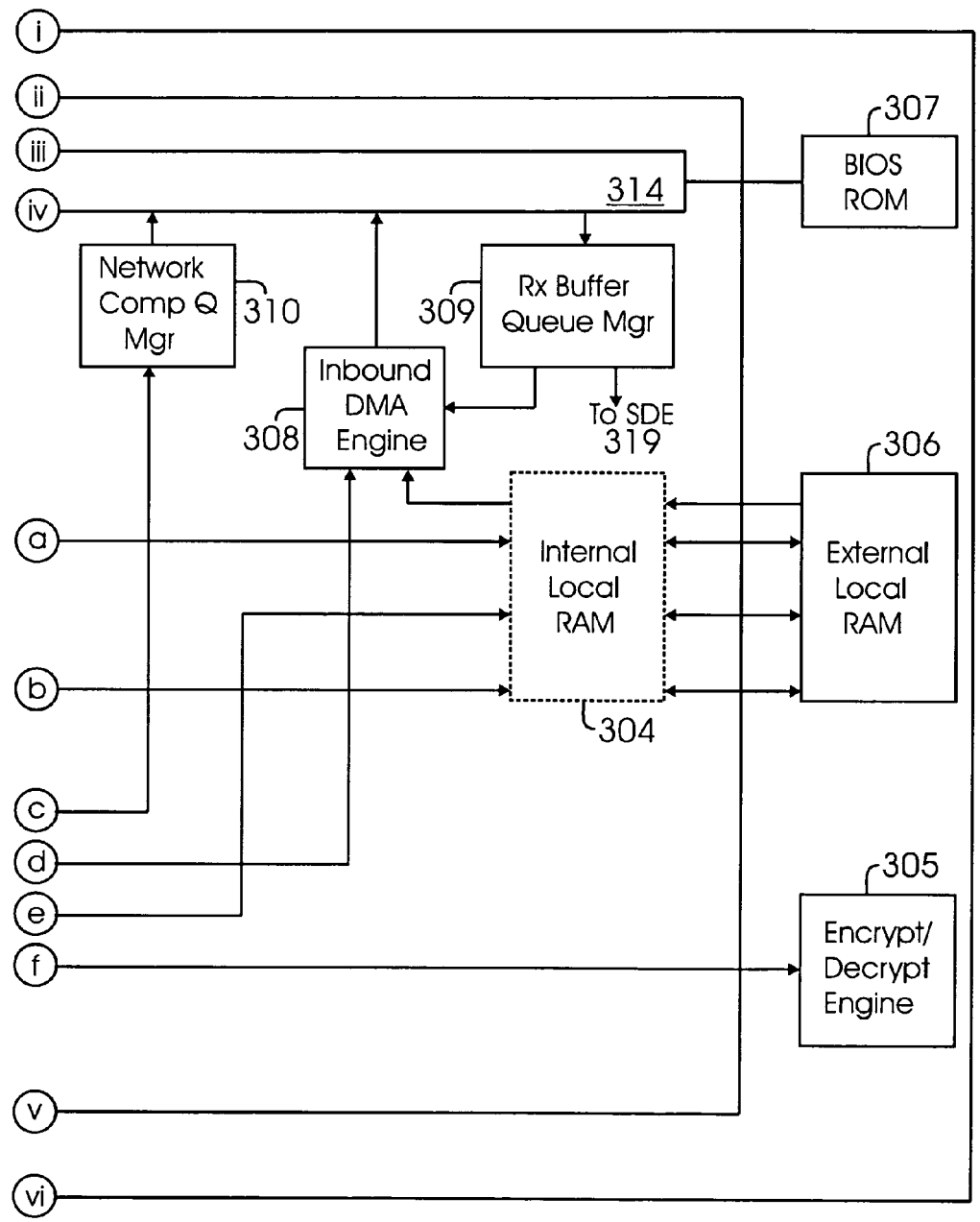

FIG. 3 shows a block diagram of network adapter 101 (may also be referred to as "system 101") according to one aspect of the present invention, with various components described below. Data enters/leaves system 101 through a serial/de-serializer ("SERDES") 301 that converts incoming and outgoing data into a serial and non-serial format.

System 101 includes an embedded processor 318 that is used to process SCSI requests into iSCSI exchanges to transfer SCSI based data. Processor 318 also generates completion messages for host 100. The term processor in this context is intended to include any hardware/state machine that can perform the intended function.

iSCSI processor 303 includes hardware state machines/ firmware which synchronizes incoming byte streams from TCP, finds iSCSI PDU boundaries, sends data to host 100 via SCSI direct memory access engine/module ("SDE") 319.

System 101 also includes network operation processors "NOPs" 302 that include plural state machines for different network protocols, for example, TCP, IP, UDP, RDMA, NFS and Ethernet for processing traffic entering and leaving system 101. The state machines handle most of the data transfer without host CPU 107 involvement.

Local memory interface 304 is used by various system 101 components to access external memory 306 (in this illustration, RAM 306).

Encryption/de-cryption engine 305 is used to encrypt/decrypt data while data is moved in and out of host 100, using system 101. Standard encryption/de-cryption techniques may be used.

Two DMA engines (or modules) are used by NOPs 302 to move data to and from host 100. Inbound DMA module 308 is used to move data from system 101 (i.e. from local memory 306) to host 100 memory. Buffer queue manager 309 maintains small and large buffers that are used by Inbound DMA engine 308. Outbound DMA engine 311 is used to move data from host 100 memory to system 101 for transmission to the network.

SCSI DMA Engine (SDE 319) provides iSCSI processor 303 with a DMA channel from Local RAM 306 to Host 100 memory. SDE 319 includes a byte packer function that takes unaligned or less than 8 byte buffers and packs them into 8 byte words before sending them to Host 100.

System 101 also includes request queue managers (the term manager and module are used interchangeably throughout this specification) (313 and 316) that are used to pass commands to chip 102 to perform a specific operation. SCSI request queue manager 316 is used for initiating SCSI based transfers, while module 313 is used for TCP, IP, Ethernet or any other protocol/standard.

Completion queue managers (310 and 317) are used to send completion messages to host 100. These messages are generated to report status of inbound (i.e. from the network to system 101 and then to host 100) to outbound (i.e. from host 100 to the network via system 101) transfers. SCSI completion manager 317 handles SCSI completion messages, while non-SCSI messages are handled by module 310.

Register interface 312 provides host 100 access to plural system 101 status and control registers, as well as a channel to access local memory 306.

PCI/PCI-X interface block 314 and PCI interface 315 provide a PCI/PCI-X interface between host 100 and system 101. BIOS Read only memory 307 is also provided to store invariant instruction sequences such as start-up instruction sequences or basic input/output operating system (BIOS) sequences instructions.

Figure 4:
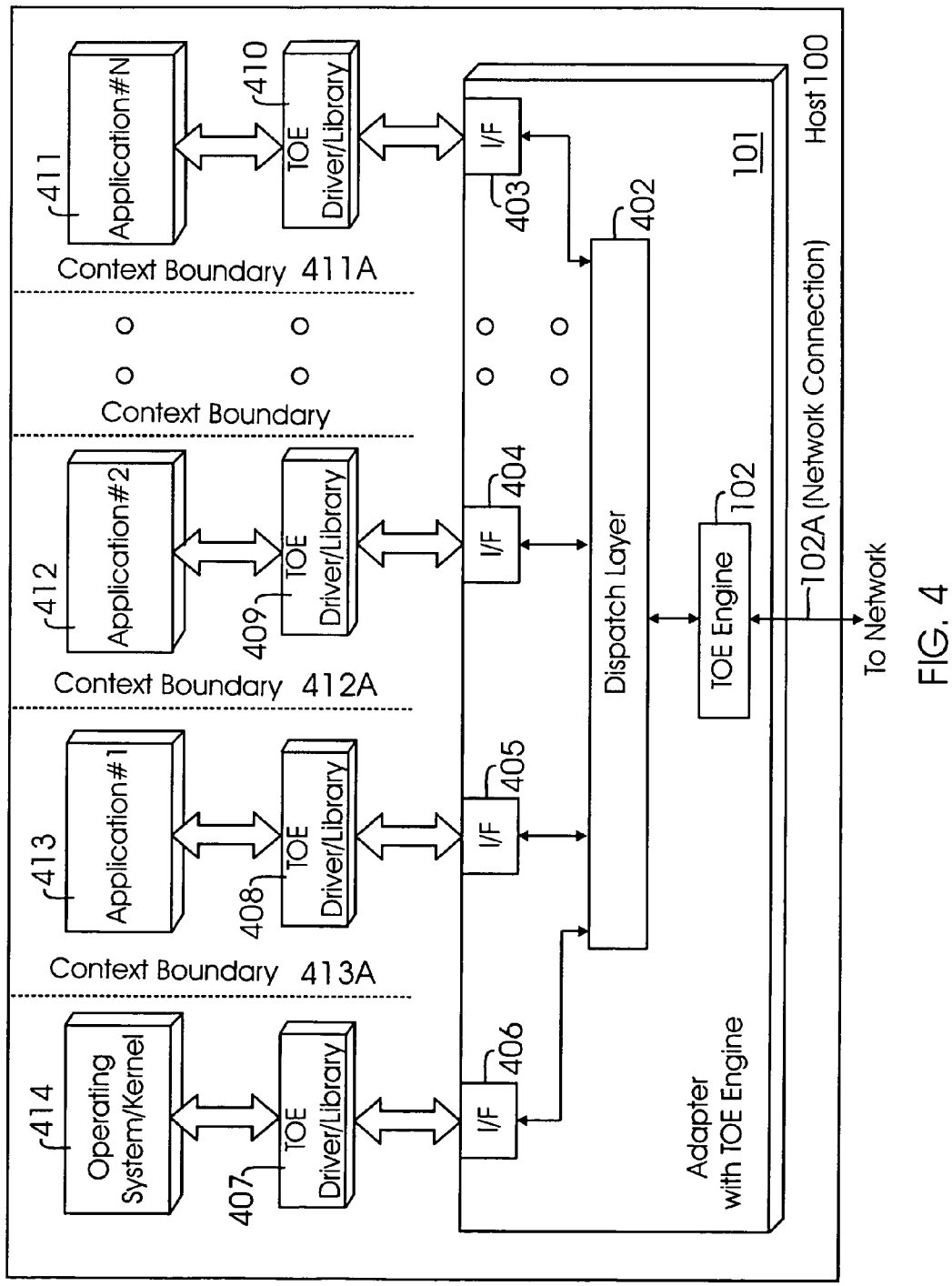
FIG. 4 is a block diagram showing a dedicated application interface for an application running on a host system to interface with a network adapter having a TOE, according to one aspect of the present invention.

FIG. 4 shows a top-level block diagram of host system 100 coupled to adapter 101, according to one aspect of the present invention. Adapter 101 with TOE 102 is described above with respect to FIG. 3. TOE 102 interfaces with a dispatch layer 402 that interfaces with plural interfaces 403, 404, 405 and 406. Interfaces 403-406 allow host operating system/application(s) access to TOE 102.

Interface 406 receives data/commands from the host operating system/kernel 414 via a TOE driver/library 407 (may be referred to as library 407). Library 407 allows the operating system to interface with TOE engine 102 via interface 406.

Plural applications shown as 411, 412 and 413 run on host system 100 in their individual contexts (shown as 411A, 412A and 413A). Each application is assigned space in system memory (shown as 110A and 110B, FIG. 1). Each application (for example, 413) has a special TOE driver/library (may also be referred to as a "module") (for example, 408, 409 and 410) that allows an application to interface directly with the TOE 102. Adapter 101 is made available to each application based on program code that runs within an application's context.

When an application (for example, 413) wants to establish a network connection, the application directly places a call via its own specific interface module (for example, 408 for application 413) without using the operating system/kernel 414. Adapter 101 establishes the connection and interfaces with the application directly through the application specific TOE driver (for example 408). In one aspect of the present invention, the operating system/kernel 414 is not involved with an application establishing a network connection.

Figure 5D:
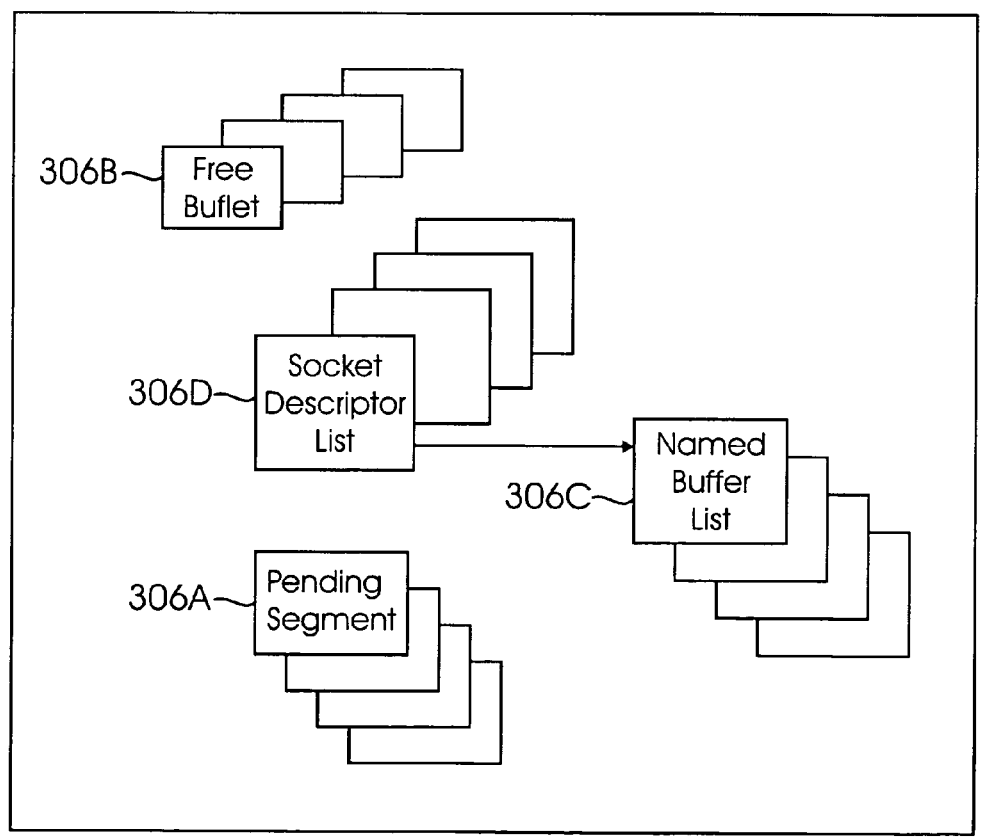
FIG. 5D shows a block diagram for local memory layout, used according to one aspect of the present invention.
Figure 5A:
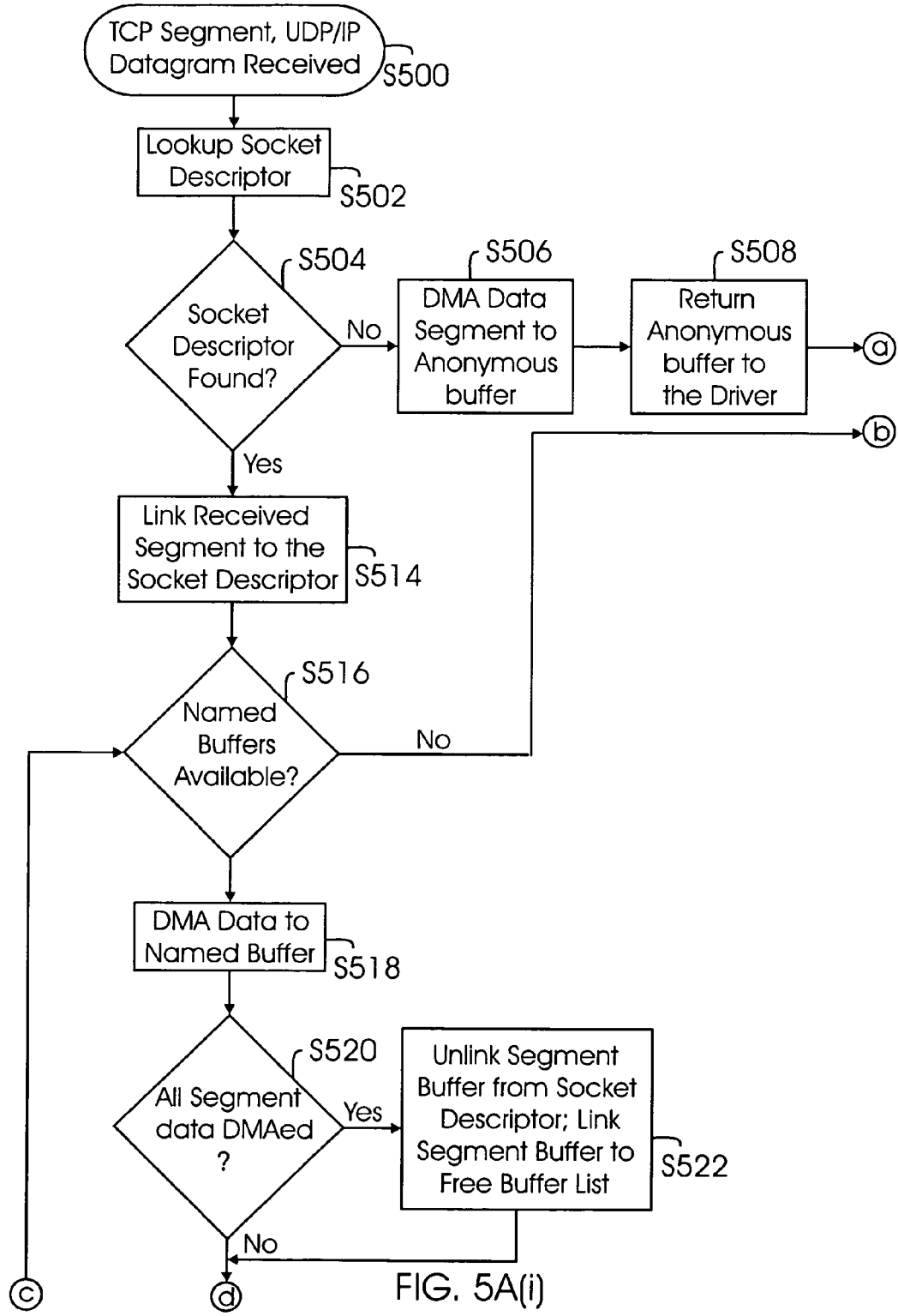
FIGS. 5A-5C show flow diagrams for using the system of FIG. 4, according to one aspect of the present invention.
Figure 5:
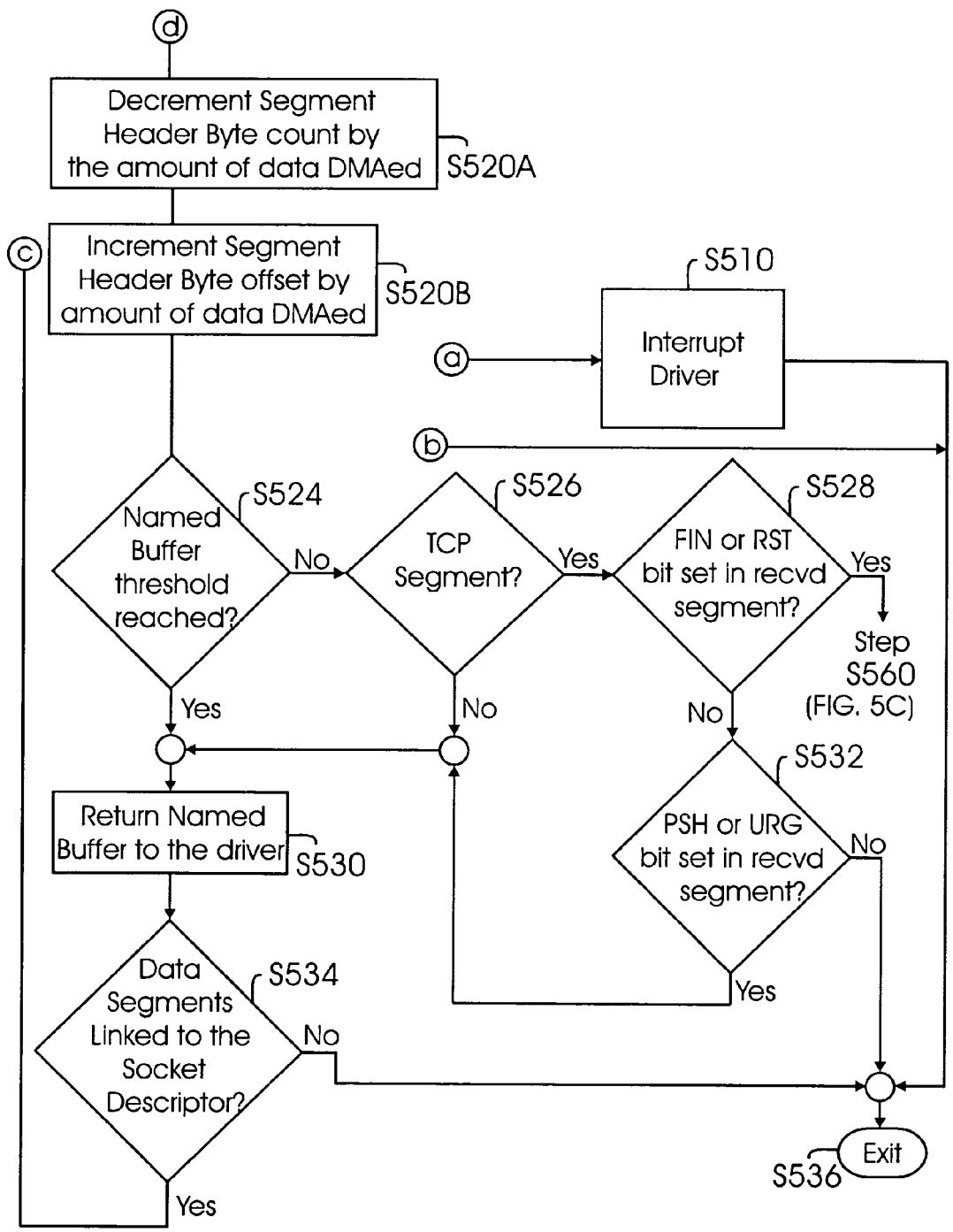
Figure 5B:
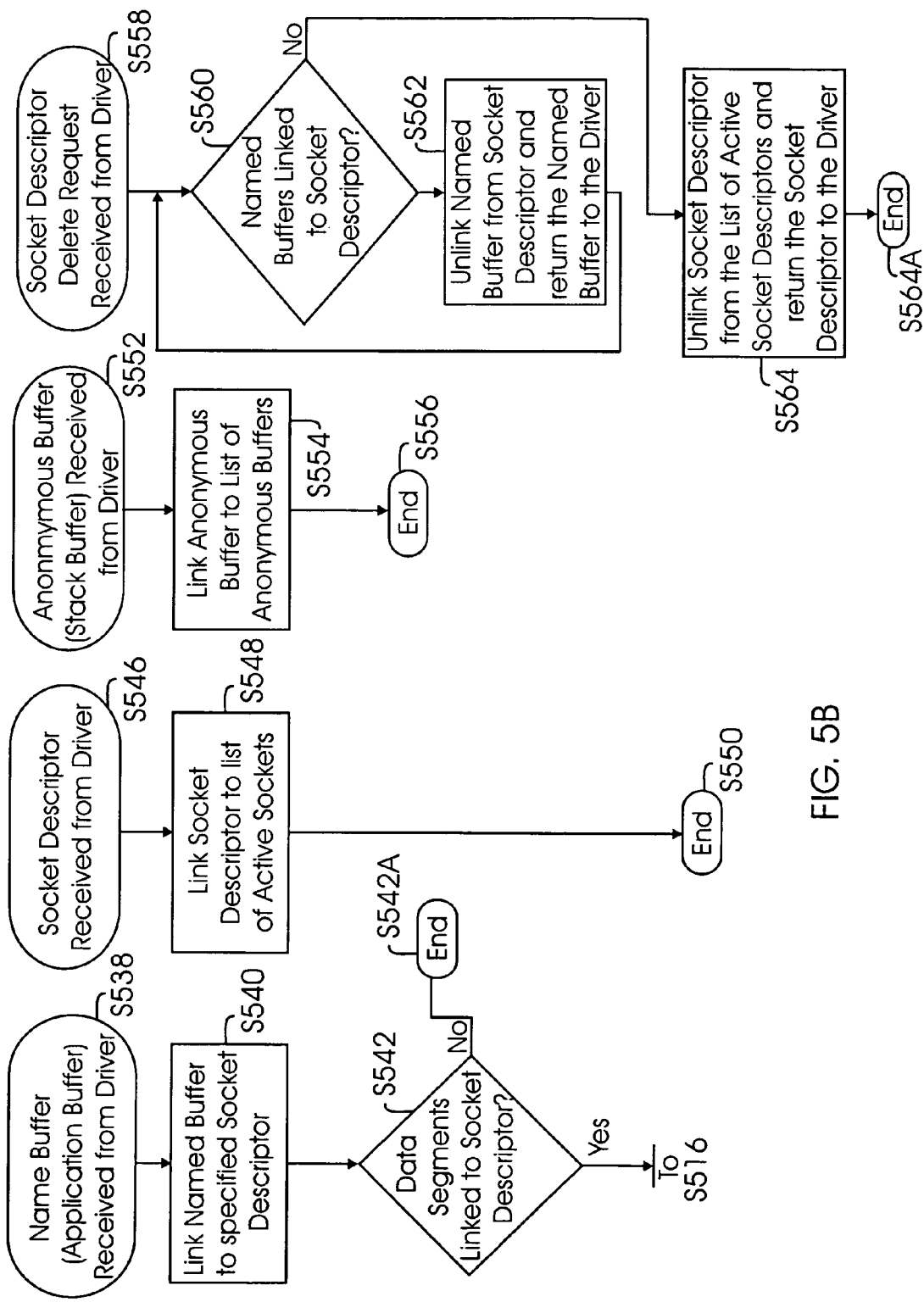
Figure 5C:
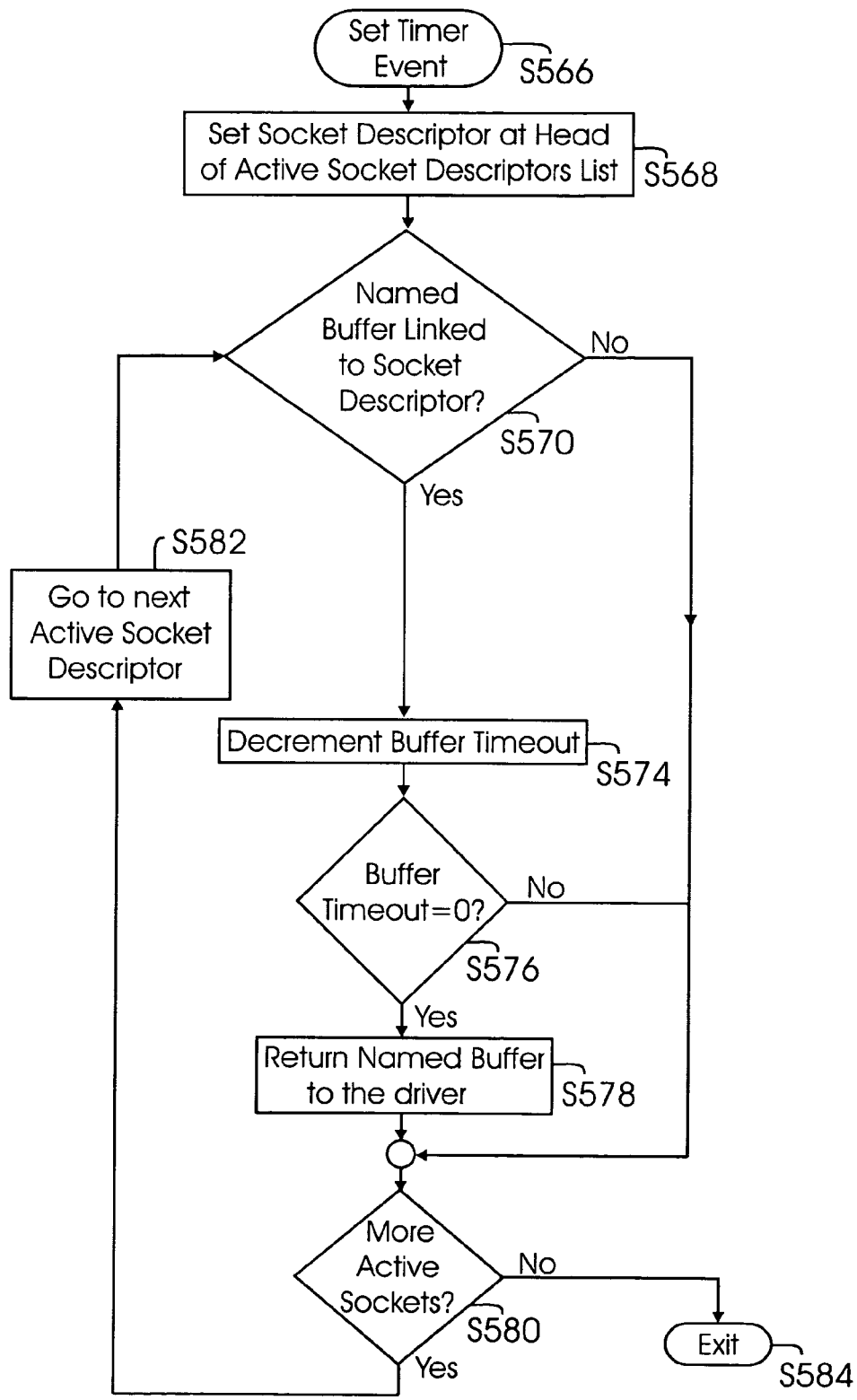

FIGS. 5A-5C show process flow diagrams with zero copy of network data received via an adapter described above with respect to FIG. 3. In one aspect, the present invention moves data to application buffers for plural applications using dedicated TOE drivers (407-410). TOE driver 407 interfaces with a socket layer of a host protocol stack or with a network application. The driver builds a socket descriptor for each socket (or connection) that is offloaded from a host system to TOE 102. As receive buffers are assigned by an application, the TOE driver 407 passes those buffers to TOE 102 and identifies the socket (or connection) to the buffers. It is noteworthy that driver 407 is only stated as an example, the present invention allows all the dedicated drivers to perform this function.

A socket descriptor provides TOE 102 with connection information. A socket descriptor may include the following information: Source MAC Address (source in this context means the device/system from where a data packet originates), Destination MAC Address (destination address in this context means the address of the device/system/location where a packet is destined), VLAN Tag (Virtual Local Area Network Identifier), Destination IP address, Source IP address, Destination port, Source port, IP user protocol type (for example, TCP or UDP), Socket Reference Number (a number that is used by TOE 102 and the TOE Driver), Next Socket Descriptor pointer (address of next Socket Descriptor), Previous Socket Descriptor pointer (address of previous Socket Descriptor), Named Buffer Descriptor List Head pointer (a pointer to the beginning of Named Buffer Descriptor List described below), Named Buffer Descriptor List Tail pointer (a pointer to the end of the Named Buffer Descriptor List described below), Segment List Head pointer (a pointer to the beginning of Segment List described below), and Segment List Tail pointer (a pointer to the end of Segment List described below).

When TOE 102 receives a socket descriptor from host driver 407 then a connection is established if a descriptor specifies a connection oriented protocol (for example, TCP). As data is received, TOE 102 stores the data in "buflets" in RAM 306. The term buflet as used herein throughout this specification means a unit of memory (i.e. page, block or cell) used for storing data.

TOE 102 processes the network headers and verifies the appropriate checksums. TOE 102 matches a received datagram with a socket. If a match is found, then data is moved directly to the first available buffer linked to the corresponding socket descriptor.

In the case of an IP/UDP datagram, after data is placed in the buffer, the buffer is returned to the TOE driver. Multiple receive buffers may be submitted by an application so that all received datagrams can be placed in the assigned buffers.

For a TCP segment, after the segment payload is copied to the assigned buffers, the buffer is returned to the TOE driver. Multiple receive buffers may be submitted by an application so that all received segments can be placed in the assigned buffers. Depending upon the size of the assigned buffer, data from plural TCP segments can be placed in the assigned buffer, before the assigned buffer is returned to the TOE driver/application.

Turning in detail to FIG. 5A, a TCP segment or a UDP/IP datagram (collectively referred to as "data" without limitation) is received by TOE 102 S500. In step S502, processor 318 looks for a socket descriptor for the received data. In step S504, if a socket descriptor is not found, then in step S506, data is sent to an anonymous buffer in Host Memory 110. Anonymous Buffers in Host Memory 110 are allocated by the TOE driver (for example, 407) and assigned to TOE 102 for passing Ethernet packets to the TOE driver for processing by the Host Networking Stack. In step S508, TOE 102 grants control of the anonymous buffer to the TOE Driver (for example, 407). In step S510, an interrupt is generated for the TOE driver and the process ends in step S536.

If a socket descriptor is found in step S504, then adapter 101 links the received segment to the socket descriptor S514. In step S516, adapter 101 determines if a "named buffer" is available. The named buffer in this context is a buffer(s) that is designated/allocated to a particular application. If a named buffer is not available, then the buflet containing the segment is linked to the corresponding Socket Descriptors list of received segments and the process ends in step S536.

FIG. 5D shows a layout of local memory 306 with buflets containing segments or datagrams 306A, Free Buflet List 306B, named buffer list 306C and Active Socket list 306D. Free buflet list 308B provides a list of free buflets that are used to store segments or datagrams received from the network and before they are sent to the host. Named buffer list 306C maintains a list for all buffers that are allocated to a particular connection. Active socket list 306D maintains a list of all active sockets (connections) that are being handled by adapter 101 at any given time.

A named buffer descriptor is used by TOE 102 to manage named buffers. The descriptor includes a Timeout value that can be set by an application, which determines the time a buffer is available for a connection; a Named Buffer Descriptor Reference Number (a handle that is used TOE 102 to move information to a named buffer); a Total Byte Count value; a Socket Descriptor Reference Number; Next Named Buffer Descriptor pointer (address of next Named Buffer Descriptor); Previous Named Buffer Descriptor pointer (address of previous Named Buffer Descriptor); Number of header Byte written to buffer (for UDP based connections); and a Host Memory Descriptor pointer (address of memory containing address and size of the host memory pages that comprise the named buffer).

A segment/buflet header is used by TOE 102 to manage buflets in local memory 306. The header includes a Link to next Buflet (if segment consists of more than one buflet this field points to next buflet), a Byte Offset value for the first Data byte of the segment; Number of data bytes in a segment; Offset to MAC Header; Offset to IP header; Offset to IP Payload and Link to next Segment.

Turning back to FIG. 5A, if a named buffer is available, then in step S518, adapter 101 schedules the segment for delivery to the named buffer. Depending on the type of data, the appropriate DMA engine is used to transfer the segment to the named buffer.

In step S520, adapter 101 determines if all of the received segment data has been scheduled (or "DMAed") for the named buffer. If all the data has been DMAed, then in step S522, the buflet containing the segment is unlinked from the socket descriptor and re-linked to the Free Buflet List 308B that is maintained by adapter 101.

If all the segment data has not been DMAed, then in step S520A, a segment header byte count value is decreased (or decremented) by the amount of data that has been DMAed. In step S520B, a segment header byte offset value is increased (or incremented) by the amount of data that has been DMAed.

Steps S520A and S520B allows TOE 102 to maintain count of the data that has been DMAed.

In step S524, adapter 101 determines if a named buffer count value has reached a threshold value. A named buffer has a threshold value that is set by the application. The threshold value determines the amount of data that can be stored in the buffer. A transfer count is maintained that determines how much data has been sent to the named buffer. If the transfer count has reached the threshold value, then adapter 101 knows that the named buffer has reached its capacity.

In step S530, the named buffer is returned to the TOE driver and in step S534, adapter 101 determines if there are more segments linked to the socket descriptor. If yes, then the process returns to step S516, otherwise, the process ends in step S536.

If the threshold value has not been reached (in step S524), then in step S526, adapter 101 determines if the segment is a TCP segment. If it is a TCP segment, then in step S528, adapter 101 determines if a "FIN" (finish) or "RST" (reset) bit is set in the segment. If a FIN or RST bit is set, then the process moves to step S560 described below in detail with respect to FIG. 5C.

If the FIN or RST bit is not set, then in step S532, adapter 101 determines if a "PSH" (push) or "URG" (urgent) bit is set. If a PSH or URG bit is set, then the process moves to step S530. If a PSH or URG bit is not set, then the process ends in step S536.

FIG. 5B shows three process flow diagrams used by adapter 101, according to the adaptive aspects of the present invention. The process flow diagrams involve various steps that are used by adapter 101 to process segments received from the network, as described above with respect to FIG. 5A.

Named Buffer Designation: In step S538, adapter 101 receives named buffer information from a TOE driver (for example, 407). Plural applications using dedicated drivers are allowed to assign named buffers. In step S540, adapter 101 links the named buffers to a socket descriptor that provides information regarding a connection. In step S542, adapter 101 determines if any segments are linked to socket descriptors. If yes, the process moves to step S516 (FIG. 5A). If segments are not linked to socket descriptors, then the process simply waits (shown as an end step S542A).

Socket descriptor: In step S546, adapter 101 receives a socket descriptor from a TOE driver (for example, 407). In step S548, Adapter 101 links the socket descriptor to a list of active sockets (or active connections). As described above, adapter 101 maintains the list of active sockets in local memory 306. The process ends in step S550.

Anonymous Buffer Links: In step S552, adapter 101 receives anonymous buffer information from TOE driver 101. Adapter 101 to store segments that are not assigned a named buffer uses the anonymous buffers. In step S554, the anonymous buffers are linked to a list (306B) of anonymous buffers that is maintained by adapter 101 in local memory 306. The process ends in step S556.

Socket Descriptor Delete Request: In step S558, TOE driver (e.g. 407) sends a request to adapter 101 to delete a socket descriptor. This may be performed if a FIN or RST bit is set in a received segment (step S528, FIG. 5A). In step S560, adapter 101 determines if there are any named buffers linked to the socket descriptor. If yes, then in step S562, adapter 101 disassociates the named buffers from the socket descriptor and returns control of the named buffer to the TOE driver. The process loops back to step S560 until there are no named buffers linked to the socket descriptor.

In step S564, after all the named buffers are released, adapter 101 removes the socket descriptor from the active socket descriptor list. The removed socket descriptor is then returned to the TOE driver. Adapter 101 maintains the list of active socket descriptors in local memory 306. This allows adapter 101 to efficiently access information regarding active connections that are being maintained and handled by adapter 101. Thereafter, the process ends in step S564A.

FIG. 5C shows a process flow diagram for efficiently managing socket descriptors and named buffers, according to one aspect of the present invention. The process starts at step S566, where TOE driver (for example, 407) sets a timer for a (or every) socket descriptor. In step S568, adapter 101 sets a socket descriptor to the head of the active socket descriptor list 306D. This is done when the first Socket Descriptor is received from the driver at step S546 described above.

In step S570, adapter 101 determines if a named buffer is linked to the socket descriptor. If not, then the process moves to step S580. If the socket descriptor is linked to a named buffer, then in step S574, the time count value in the named buffer descriptor is decreased. A timer (in the Named Buffer Descriptor) maintains a count S576 (i.e. the amount of time elapsed for every connection). If a timeout has occurred, then the named buffer is returned in step S578. If a timeout has not occurred, then the process moves to step S580.

In step S580, adapter 101 determines if there are some more active sockets. If yes, then in step S582, the process moves to the next active socket descriptor. If there are no active sockets, the process ends in step S584.

The present invention allows multiple applications with dedicated TOE drivers to allocate buffers for network connections. The network adapter can move data directly to the named buffers that are designated by the applications. The process is efficient because minimum copying is required to move data to a designated location.

Although the present invention has been described with reference to specific embodiments, these embodiments are illustrative only and not limiting. Many other applications and embodiments of the present invention will be apparent in light of this disclosure and the following claims.

What is claimed is:

1. A system coupled to a network for receiving and sending network packets, comprising:
   a host processor that executes an operating system for a host system and at least one application that runs in a context that is different from a context of the operating system;
   an interface module specific to the application; and
   a network adapter with a hardware device that can run a network protocol stack;
   wherein when the application wants to establish a network connection, the application directly places a call via its specific interface module and without using the operating system, the network adapter establishes the network connection and interfaces with the application directly through the application specific interface module, the application designates a named memory buffer for the network connection, and when data is received by the network adapter for the network connection, then the network adapter passes the received data directly to the designated named memory buffer.

2. The system of claim 1, wherein the network protocol stack is a TCP/IP stack.

3. The system of claim 1, wherein the hardware device is a TCP/IP offload engine.

4. The system of claim 3, wherein the TCP/IP offload engine processes TCP/IP packets, instead of the host system.

5. The system of claim 1, wherein a plurality of applications running on the host system can access the network adapter, each of the plurality of applications can access the network adapter via its corresponding specific interface module.

6. The system of claim 1, wherein the network adapter is configured to look for a socket descriptor for newly received data and, if the socket descriptor is not found, the newly received data is sent to an anonymous buffer.

7. The system of claim 1, wherein the network adapter is configured to look for a socket descriptor for newly received data and, if the socket descriptor is found, the newly received data is linked to the socket descriptor.

8. The system of claim 7, wherein the network adapter is configured to determine if the named memory buffer is available.

9. The system of claim 8, wherein if the named memory buffer is not available, a buflet containing the newly received data is linked to a socket descriptors list of received data.

10. The system of claim 8, wherein if the named memory buffer is available, the newly received data is scheduled for delivery to the named memory buffer.

11. A method for network communication, comprising:
a network adapter coupled to a host computing system processing network traffic by executing a network protocol;
an application having its own context in the host computing system initializing a socket call when the application wants to establish a network connection by directly placing the socket call via its own specific interface module and without using an operating system that runs on the host computing system;
the network adapter establishing the network connection and interfacing with the application directly through the application specific interface module;
sending a socket descriptor to the network adapter that identifies plural parameters for the network connection; and
the application designating a named buffer for the network connection, wherein data received by the network adapter for the network connection is transferred directly to the named buffer.

12. The method of claim 11, wherein context switching between the application and the operating system is not needed to transfer packets using the network adapter.

13. The method of claim 11, further comprising looking for a socket descriptor for newly received data and if the socket descriptor is not found sending the newly received data to an anonymous buffer.

14. The method of claim 11, further comprising looking for a socket descriptor for newly received data and if the socket descriptor is found, linking the newly received data to the socket descriptor.

15. The method of claim 14, further comprising determining if the named buffer is available.

16. The method of claim 15, further comprising, if the named buffer is not available, linking a buflet containing the newly received data to a socket descriptors list of received data.

17. The method of claim 15, further comprising, if the named buffer is available, scheduling the newly received data for delivery to the named buffer.

18. A host computing system coupled to a network for receiving and transferring network packets, comprising:
a host processor that executes an operating system and at least one application that runs in a context that is different from a context of the operating system; and
an interface module specific to the application;
wherein a network adapter includes a hardware device for executing a network protocol stack for processing network traffic, and when the application wants to establish a network connection, the application directly places a call via its specific interface module and without using the operating system, the network adapter establishes the network connection and interfaces with the application directly through the application specific interface module, the application designates a named memory buffer for the network connection, and when data is received by the network adapter for the network connection, then the network adapter passes the received data directly to the designated named memory buffer.

19. The host computing system of claim 18, wherein the network protocol stack is a TCP/IP stack.

20. The host computing system of claim 18, wherein the hardware device is a TCP/IP offload engine.

21. The host computing system of claim 20, wherein the TCP/IP offload engine processes TCP/IP packets, instead of the host system.

22. The host computing system of claim 18, wherein the network adapter is configured to look for a socket descriptor for newly received data and, if the socket descriptor is not found, the newly received data is sent to an anonymous buffer.

23. The host computing system of claim 18, wherein the network adapter is configured to look for a socket descriptor for newly received data and, if the socket descriptor is found, the newly received data is linked to the socket descriptor.

24. The host computing system of claim 23, wherein the network adapter is configured to determine if the named memory buffer is available.

25. The host computing system of claim 23, wherein if the named memory buffer is not available, a buflet containing the newly received data is linked to a socket descriptors list of received data.

26. The host computing system of claim 24, wherein if the named memory buffer is available, the newly received data is scheduled for delivery to the named memory buffer.

27. A network adapter for offloading network protocol processing from a host system, comprising:
an offload engine that offloads network protocol processing from a host processor of the host system having an operating system and at least one application that runs in a context that is different from a context of the operating system;
wherein when the application wants to establish a network connection, the application directly places a call via its own specific interface module and without using the operating system, the network adapter establishes the network connection and interfaces with the application directly through the application specific interface module, the application designates a named memory buffer for the network connection, and when data is received by the network adapter for the network connection, then the network adapter passes the received data directly to the designated named memory buffer.

28. The network adapter of claim 27, wherein the offload engine is a TCP/IP offload engine.

29. The network adapter of claim 28, wherein the TCP/IP offload engine processes TCP/IP packets, instead of the host system.

30. The network adapter of claim 27, wherein the network adapter is configured to look for a socket descriptor for newly received data and, if the socket descriptor is not found, the newly received data is sent to an anonymous buffer.

31. The network adapter of claim 27, wherein the network adapter is configured to look for a socket descriptor for newly received data and, if the socket descriptor is found, the newly received data is linked to the socket descriptor.

32. The network adapter of claim 31, wherein the network adapter is configured to determine if the named memory buffer is available.

33. The network adapter of claim 32, wherein if the named memory buffer is not available, a buflet containing the newly received data is linked to a socket descriptors list of received data.

34. The network adapter of claim 32, wherein if the named memory buffer is available, the newly received data is scheduled for delivery to the named memory buffer.

* * * * *

UNITED STATES PATENT AND TRADEMARK OFFICE
CERTIFICATE OF CORRECTION

| | |
|---|---|
| PATENT NO. | : 7,735,099 B1 |
| APPLICATION NO. | : 11/317315 |
| DATED | : June 8, 2010 |
| INVENTOR(S) | : Charles Micalizzi, Jr. |

Page 1 of 1

It is certified that error appears in the above-identified patent and that said Letters Patent is hereby corrected as shown below:

In column 12, line 28, in claim 25, delete "claim 23," and insert -- claim 24, --, therefor.

Signed and Sealed this

Twenty-sixth Day of October, 2010

David J. Kappos
*Director of the United States Patent and Trademark Office*